United States Patent [19]

Wells et al.

[11] 3,852,202

[45] Dec. 3, 1974

[54] INERT PACKER FLUID ADDITIVE COMPRISING ASBESTOS AND FUMED ALUMINA

[75] Inventors: Paul C. Wells; Raymond E. McGlothlin, both of Houston, Tex.

[73] Assignee: Dresser Industries, Inc., Dallas, Tex.

[22] Filed: Oct. 18, 1972

[21] Appl. No.: 298,966

[52] U.S. Cl. ...... 252/8.55 R, 252/8.5 R, 252/8.5 B, 252/8.55 B
[51] Int. Cl. .............................................. C09k 3/10
[58] Field of Search ......... 252/8.55 R, 8.5 R, 8.5 B, 252/8.55 B

[56] References Cited
UNITED STATES PATENTS

| 2,779,417 | 1/1957 | Clark et al. | 252/8.55 R |
|---|---|---|---|
| 2,811,207 | 10/1957 | Clark | 252/8.55 R |
| 2,830,948 | 4/1958 | Popham | 252/8.5 M |
| 2,950,247 | 8/1960 | McGuire, Jr. et al. | 252/8.55 R |
| 2,995,514 | 8/1961 | Jordan et al. | 252/8.5 M |
| 3,173,484 | 3/1965 | Huitt et al. | 252/8.55 R |
| 3,471,402 | 10/1969 | Shannon et al. | 252/8.5 B |
| 3,498,394 | 3/1970 | Goodwin et al. | 252/8.5 B |
| 3,659,651 | 5/1972 | Graham | 252/8.55 R |
| 3,719,601 | 3/1973 | Jacocks | 252/8.55 R |

*Primary Examiner*—Leland A. Sebastian
*Assistant Examiner*—B. Hunt

[57] ABSTRACT

A well completion and packer fluid additive consisting essentially of finely divided chrysotile asbestos and fumed alumina predominately of the gamma crystalline modification. The fluids prepared with this additive have greater temperature stability and improved weight suspending characteristics. In addition, there is less gellation and after extended exposure to temperatures above 250°F., under quiescent conditions, the system can be easily fluidized and displaced from the well bore.

9 Claims, No Drawings

INERT PACKER FLUID ADDITIVE COMPRISING ASBESTOS AND FUMED ALUMINA

In completing oil and gas wells the completion-packer fluid should have certain properties such that the fluid will perform desired functions properly. This is accomplished by maintaining a column of mud with a hydrostatic pressure equal to or slightly greater than the formation pressure exposed when the casing is perforated. To provide a column having sufficient hydrostatic pressure, it is necessary to add weighting agents such as barite, calcium carbonate, iron oxide or other heavy solids to the fluid. Also, the fluid should have sufficient viscosity and gel structure to suspend the weight material. However, the viscosity and gel structure must be such that pumping operations will not be difficult. Since a well packer fluid is maintained under quiescent conditions in the well bore at elevated temperatures for substantial periods of time, the high temperature properties of the fluid must be such that the mud does not gel into a cement-like consistency. This is required because periodically most wells must be reworked which involves the packer fluid being displaced from the annulus. If the fluid becomes unpumpable and the packer fluid cannot be removed from the well bore it becomes necessary to mechanically drill out the solidified fluid. This greatly increases the cost of reworking the well.

As drilling continues deeper and deeper in search of petroleum, the temperature gradient increases creating more stringent requirements on fluids pumped in the annulus as a packer mud. In accordance with the present invention, these parameters can be completely satisfied by employing an improved well completion-packer fluid additive hereinafter described.

We have found that a very effective completion-packer fluid is obtained by utilizing an additive comprising asbestos and fumed alumina. The additive can be utilized in water and also in oil base systems. When preparing an oil base packer mud additive, the wettability of the asbestos may be changed to hydrophobic, if desired, by coating the fibers with a layer of an organic titanate or a fluorochemical, for example. With the addition of barite or other weighting agents to obtain the density required to maintain hydrostatic balance, a coomplete packer mud can be prepared.

According to a preferred embodiment of the invention a well completion-packer fluid additive consists essentially of (1) finely divided asbestos derived from chrysotile and (2) fumed alumina. In addition, the system can contain a minor, but effective, amount of at least one surface active dispersing agent to maintain the separation of individual colloidal particles.

Asbestos is the name given to the serpentine and amphibole groups of fibrous inorganic minerals occurring in nature. It is reported in the literature there there are six types of asbestos differing in chemical composition and texture of fibers. Chemical and mineralogical studies have shown that the chrysotile variety, which constitutes approximately 95 percent of total world production, is the most important type. Although the asbestos employed can comprise one or more of any of the known species of that mineral, the preferred type is from the mineral chrysotile.

The degree of effectiveness of chrysotile asbestos in the present invention is dependent upon the purification achieved during its manufacture. Commercial preparation of asbestos involves milling followed by suitable separation procedures such as washing or air flotation. It has been found that the effectiveness increases with the purity and degree of processing which mainly determines the fineness of fiber diameter and length. The asbestos should be of a fineness such that it will pass 16 mesh (U.S. Sieve Series) and better still a fineness such that it will pass 50 mesh. Preferably, the fibers should be around 0.025 microns in diameter and an average length of 200 microns.

Fumed alumina is the term generally used to designate $Al_2O_3$ deposited from the vapor phase and having a fine particle size. One such product, Alon manufactured and sold by Cabot Corporation, is of different crystalline form consisting predominantly of the gamma modification and is produced by the hydrolysis of aluminum chloride in a flame process similar to that used for making fumed silica from silicon tetrachloride. This oxide material has a positive surface charge to a pH level of 9.1 and a very high surface area of $100 m^2/g$ which produces high functional activity from relatively small quantities. The average particle diameter is 0.03 microns, and the alumina content is 99+%. The fumed alumina can be used in varying weight range ratios of about 1-20/20-1 with asbestos. The preferred ratio of alumina to asbestos is 1/5. Other available fumed aluminas can be employed which have an average particle diameter of less than about 5 microns.

When a surface active dispersing agent is employed, it reduces the interattraction of forces between the extremely fine colloidal particles which results in a lowering of the rheological properties. A large number of materials are known in the art and available for use. Suitable materials are categorized as to functional groups and listed in the annual book "McCutcheon's Detergents and Emulsifiers" published by Allured Publishing Company After a study of this book, it readily becomes obvious that there are a large number of materials which are applicable. Exemplary of these are alcohol sulfates, alkylaryl sulfonates, hydrocarbon sulfonates, ethoxylated alcohol sulfates, fatty alcohol phosphates and ethylene oxide condensates. Other useful materials are set forth in U.S. Pat. No. 2,995,514 which is incorporated herein by reference. Substantially any material or mixture of materials can be used which are effective in dispersing the asbestos and/or fumed alumina in the liquid phase, water and/or oil.

The packer fluid additive is prepared by simply mixing the asbestos and fumed alumina into the liquid phase and stirring until a homogeneous mixture is obtained. If a dispersing agent is to be used, it can be added to the system during and/or after the asbestos and fumed alumina. The fluid is then weighted to a desired density sufficient to balance the formation pressures.

The following examples are illustrative of the invention and show why the combination of asbestos and fumed alumina offers a superior additive.

Eight mud compositions were prepared each containing 222 cc of water and 6 g of colloidal solids. After addition of the solids, and dispersents when required by predetermined test conditions, the system was stirred until a homogenuous mixture was obtained. The samples were then weighted to 16 lbs/gal by the addition of 470 g of barite.

After measuring the rheology of each sample, they were placed in a static oven maintained at a temperature of 300°F. and heat aged for 7 days. At the end of this period, the shear strength in lbs./100 ft² was measured before remixing and recording the rheology.

temperature and pressure until a homogeneous mixture is obtained and then the solids are dried. Development

TABLE I

| SAMPLE NUMBER | COMPOSITION | LBS/BBL | WATER SEPARATION | GEL | | AV (CPS) | PV (CPS) | YP LBS/100 FT² | SHEAR STRENGTH LBS 100 FT² |
|---|---|---|---|---|---|---|---|---|---|
| 1 | Fumed Alumina | 1. | | | Immed | 38 | 26 | 23 | |
|   | Asbestos | 5. | 1/4" | Med | Heat Aged | 34 | 24 | 17 | 140 |
| 2 | Fumed SiO₂ | 1. | | | Immed | 33 | 23 | 19 | |
|   | Asbestos | 5. | 5/8" | Firm | Heat Aged | 43 | 23 | 39 | 390 |
| 3 | Asbestos | 6. | | | Immed | 27 | 19 | 25 | |
|   | | | 1/2" | Med | Heat Aged | 45 | 25 | 40 | 220 |
| 4 | Fumed Alumina | 1. | | | Immed | 34 | 26 | 15 | |
|   | Asbestos | 5. | 3/16" | Med Soft | Heat Aged | 35 | 29 | 13 | 140 |
|   | Ethyleneoxide Condensate | 1. | | | | | | | |
| 5 | Fumed Alumina | 6. | | | Immed | 18 | 13 | 10 | |
|   | | | 1" | Firm | Heat Aged | 19 | 15 | 8 | 300 |
| 6 | Fumed Alumina | 1. | | | Immed | 29 | 23 | 12 | |
|   | Asbestos | 50 | 1/4" | Med Soft | Heat Aged | 48 | 32 | 33 | 130 |
|   | Titanate Triethanol Amine Chelate | 0.5 | | | | | | | |
| 7 | Fumed Alumina | 1. | | | Immed | 27 | 23 | 9 | |
|   | Asbestos | 5. | 3/16" | Med Soft | Heat Aged | 31 | 29 | 3 | 120 |
|   | Ethyleneoxide | 1. | | | | | | | |
|   | Titanate Triethanol Amine Chelate | 0.5 | | | | | | | |
| 8 | Fumed Alumina | 1. | | | Immed | 38 | 22 | 32 | |
|   | Asbestos * | 5. | 5/16" | Soft | Heat Aged | 25 | 20 | 11 | 27 |
| 9 | Fumed Alumina | .25 | | | Immed | 35 | 28 | 14 | |
|   | Asbestos | 5.75 | 1/4" | Med | Heat Aged | 38 | 29 | 17 | 150 |
| 10 | Fumed Alumina | 5.75 | | | Immed | 21 | 15 | 11 | |
|   | Asbestos | .25 | 5/8" | Med Firm | Heat Aged | 20 | 17 | 6 | 200 |
| 11 | Fumed Alumina | 5.0 | | | Immed | 26 | 19 | 14 | |
|   | Asbestos | 1.0 | 3/16" | Med | Heat Aged | 25 | 17 | 16 | 160 |

* Fibers made hydrophobic with TLF-1800 fluorochemical

From the data listed in Table I, it is apparent that the combination of fumed alumina and asbestos is superior to other samples tested in both rheology and gel structure. The data also demonstrates that small but effective additions of dispersents lower the rheology with the shear strength remaining fairly constant. One sample which had an unusually low shear strength structure was a combination of fumed alumina and asbestos in which the asbestos fibers had been made oil and water repellent by coating with a film of fluorochemical. The fluorochemical used in the exemplary sample was TLF—1800, a proprietary product of E. I. DuPont de Nemours and Company (Inc.). It is an anionic long chain fluoroalkyl phosphate ester containing 33% solids, having a Brookfield viscosity of 10-25 cps at 80°F. and a pH of 6.5 to 8.5.

The procedure for obtaining the repellency is by coating the surface of colloidal solids with an aqueous solution of a fluorochemical. Solutions of the anionic fluorochemical are prepared by diluting the product to the desired concentration range, preferably from about 0.01 to about 10, still more preferably from about 0.5 to about 2.0 weight per cent based on the total weight of the solids to be treated, in water. The solids to be coated are then blended in this water slurry at ambient temperature and pressure until a homogeneous mixture is obtained and then the solids are dried. Development of repellency does not require heat or curing beyond that normally used to remove water. Other agents for imparting oil and water repellency may also be employed.

The fumed alumina-asbestos additive may also be employed in oil base packer muds. Such oils include crude oil, refined products of crude as fuel oil, diesel oil and kerosene. In this application the preferred method is to make the asbestos fibers water repellent by pretreating with one of several available materials. Two materials used in coating the asbestos were a long chain fluorochemical derivative discussed earlier under water base packer muds and an organotitanium compound usually referred to as organic titanates. Compounds in the titanate series vary widely in their reactivity, stability, to hydrolysis and solubility properties. Upon hydrolysis, a film of titanium dioxide is deposited on any charged surface which then changes the surface chemistry of the solids coated, making them hydrophobic.

The titanates useful in this invention are known in the art and are available commercially. Suitable titanates are those compounds of the formula 1. Ti(OR) where R is one of alkyl, cycloalkyl and aryl, each having from 1 to 22, preferably 1 to 18 carbon atoms per molecule, inclusive, the R's being the same or different in any given molecule 2. $[Ti(OCOR_1)_{4-x}](OR_1)_n$ where $x$ is 1 to 9, $n$ is 0 to 3, inclusive, R is one of alkyl, cycloalkyl, and aryl, each having from 1 to 22 carbon atoms per molecule, inclusive, the R's being the same or different in any given molecule and a chelate of the formula (3)
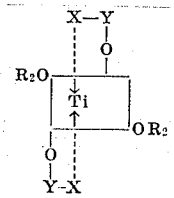

where $x$ represents the electron donating atom oxygen, nitrogen, NH, $-n$ $(R''OH)_z$, $R''$ is alkyl having from 1 to 10 carbon atoms, inclusive, and Z is 1 or 2; $y$ is one of

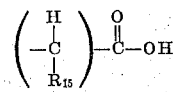

$R_{15}$ is hydrogen or alkyl having from 1 to 10 carbon atoms, inclusive and $m$ is 1 or 2,

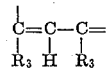

$R_3$ being alkyl having from 1 to 8 carbon atoms, inclusive

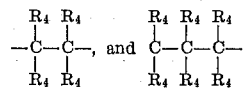

$R_4$ being hydrogen or alkyl having from 1 to 4 carbon atoms, inclusive; and $R_2$ is one of hydrogen, alkyl having from 1 to 10 carbon atoms, inclusive, and $R_5OH$ where $R_5$ is alkylene having from 1 to 10 carbon atoms, inclusive. The above titanate structures are disclosed in the publication "TYZOR" Organic Titanates by E. I. DuPont de Nemours and Company (Inc.).

Suitable specific titanates include tetraisopropyl titanate, tetrabutyl (including n-butyl, isobutyl, sec-butyl, tert-butyl), titanate, tetrakis (2-ethylhexyl) titanate, tetrastearyl titanate, polyhydroxy stearate titanate, tetraoctylene glycol titanate, triethanolamine titanate, titanium acetyl acetonate, titanium lactate, alkali metal salts of titanium lactate, and ammonium salts of titanium lactate.

There are several ways in which a thin film of titanium dioxide can be deposited on the surface of solids to obtain the desired hydrophobicity. However, the more common method is to coat the solids by dispersing in a nonaqueous solvent. The desired concentration of titanate is dissolved in a solvent as $CCl_4$, $CHCl_3$, benzene, hexane, etc., and then the solids are completely dispersed. The solids are then filtered from the slurry and dried at a temperature sufficient to remove excess solvent.

The preferable concentration range is from about 0.01 to about 10, still more preferably from about 0.5 to about 2.0 weight per cent based on the total weight of solids to be coated.

Examples listed in Table II are illustrative of the effectiveness of preparing an oil packer mud using a combination of fumed alumina and asbestos.

Nine mud samples were prepared in two bbl/eq. each containing 478 cc of diesel oil and 12 g of the additive. After addition of the solids and dispersent, when required by predetermined test conditions, the systems were stirred until a homogeneous mixture was obtained. The samples were then weighted to 16 lbs/gal with the addition of 940 g of barite.

After measuring the rheology of each mud, the samples were split into separate bbl/equiv. with one sample being aged at 300°F. and the second bbl/eq. aged at 450°F. All samples were placed in static ovens maintained at the temperatures listed and heat aged for 7 days.

TABLE II

| SAMPLE NUMBER | COMPOSITION | LBS/BBL | WATER SEPARATION | GEL | | AV (CPS) | PV (CPS) | LBS/100 FT² | SHEAR LBS/100 FT² |
|---|---|---|---|---|---|---|---|---|---|
| 1 | Fumed Alumina | 1. | | | Immed | 83 | 25 | 115 | |
| | Asbestos | 5. | 1/2" | Soft | 300° | 87 | 32 | 111 | 15 |
| | | | 5/16" | Soft | 450° | 40 | 32 | 15 | 23 |
| 2 | Fumed SiO₂ | 1. | | | Immed | 93 | 30 | 120 | |
| | Asbestos | 5. | 7/16" | Med | 300° | 96 | 29 | 134 | 15 |
| | | | 3/4" | Med | 450° | 73 | 52 | 41 | 13 |
| 3 | *Asbestos | 6. | | | Immed | 133 | 30 | 205 | |
| | | | 1/2" | Soft | 300° | 128 | 35 | 185 | 21 |
| | | | 3/8" | Soft | 450° | 44 | 36 | 16 | 12 |
| 4 | Fumed Alumina | 6. | | | Immed | 76 | 22 | 108 | |
| | | | 7/8" | Soft | 300° | 55 | 18 | 74 | 26 |
| | | | 1/2" | Soft | 450° | 30 | 29 | 1 | 10 |
| 5 | Fumed Alumina | 1. | | | Immed | 75 | 15 | 120 | |
| | *Asbestos | 5. | 5/16" | Soft | 300° | 84 | 16 | 126 | 28 |
| | | | 1/2" | Soft | 450° | 80 | 40 | 80 | 10 |
| 6 | Fumed Alumina | 1. | | | Immed | 37 | 22 | 30 | |
| | Asbestos | 5. | tr | Soft | 300° | 29 | 24 | 9 | 12 |
| | Ethyleneoxide Condensate | 1. | 1/4" | Soft | 450° | 31 | 27 | 7 | 11 |
| 7 | Fumed Alumina | 1. | | | Immed | 89 | 36 | 106 | |
| | Asbestos | 5. | 1/2" | Soft | 300° | 84 | 41 | 86 | 17 |
| | Titanate Triethanol Amine Chelate | 0.5 | 3/8" | Soft | 450° | 40 | 23 | 34 | 14 |

TABLE II — Continued

| SAMPLE NUMBER | COMPOSITION | LBS/BBL | WATER SEPARATION | GEL | | AV (CPS) | PV (CPS) | LBS/100 FT² | SHEAR LBS/100 FT² |
|---|---|---|---|---|---|---|---|---|---|
| 8 | Fumed Alumina | 1. | | | Immed | 44 | 22 | 43 | |
| | Asbestos | 5. | tr | Soft | 300° | 42 | 22 | 39 | 14 |
| | Ethyleneoxide Condensate | 1. | 1/4" | Soft | 450° | 41 | 34 | 14 | 10 |
| | Titanate Triethanol Amine Chelate | 0.5 | | | | | | | |
| 9 | Fumed Alumina | 1. | | | Immed | 27 | 24 | 6 | |
| | **Asbestos | 5. | 3/4" | Soft | 300° | 29 | 25 | 7 | 13 |
| | Ethyleneoxide Condensate | 1. | 1/16" | Soft | 450° | 28 | 24 | 8 | 13 |
| | Titanate Triethanol Amine Chelate | 0.5 | | | | | | | |

*The asbestos in this sample was not coated
**The asbestos here was coated with flurochemical
All other samples were coated with an organic titanate.

From this data, it becomes evident that the combination of asbestos and fumed alumina exhibits unusual rheology in an oil phase packer mud. When used in conjunction with an organic emulsifier-dispersent, the effect is even more pronounced.

The embodiments of the invention in which an exclusive property or privilege is claimed are defined as follows:

1. A well completion packer fluid additive comprising finely divided asbestos and fumed alumina.

2. The additive of claim 1 in which the asbestos and alumina are present in a weight range ratio of about 1-20/20-1.

3. The additive according to claim 1 wherein asbestos is present in an amount of from 1 to 5 pounds per barrel and subdivided to substantially all pass a 16 mesh sieve, and fumed alumina is present in an amount of from 1 to 5 pounds per barrel and the average particle diameter is less than about 5 microns.

4. The additive according to claim 1 wherein the asbestos fibers are coated with 0.01 to 10.0 per cent by weight of an organic titanate to make it hydrophobic.

5. The additive according to claim 1 wherein there is additionally present a minor, but effective, dispersing amount of at least one dispersing agent.

6. The additive according to claim 1 wherein the asbestos fibers are coated with 0.01 to 10.0 per cent by weight of a long chain fluorochemical derivative to make it oil and water repellent.

7. A water base well completion packer fluid according to claim 2 in which the asbestos fibers are coated with a long chain fluorochemical derivative and in addition there is present a minor, but effective, amount of a dispersing agent.

8. An oil base well completion packer fluid according to claim 2 in which the asbestos fibers are coated with an organic titanate and in addition there is present a minor, but effective, amount of a dispersing agent.

9. An oil base well completion packer fluid of claim 2 in which the asbestos fibers are coated with a long chain fluorochemical derivative and in addition there is present a minor, but effective, amount of a dispersing agent.

* * * * *